(12) United States Patent
Shaikh et al.

(10) Patent No.: US 12,367,217 B2
(45) Date of Patent: Jul. 22, 2025

(54) APPROXIMATE METRIC FOR DATASET USING REPRESENTATIVE SUBSET

(71) Applicant: Oracle International Corporation, Redwood Shores, CA (US)

(72) Inventors: Furqan Abdul Samad Shaikh, Bengaluru (IN); Amit Kumar Prajapati, Kolkata (IN); Antariksha Bhaduri, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/655,946

(22) Filed: May 6, 2024

(65) Prior Publication Data
US 2025/0217383 A1   Jul. 3, 2025

(30) Foreign Application Priority Data

Dec. 29, 2023  (IN) .............................. 202341089847

(51) Int. Cl.
*G06F 16/27* (2019.01)
(52) U.S. Cl.
CPC .................................. *G06F 16/278* (2019.01)
(58) Field of Classification Search
None
See application file for complete search history.

(56) References Cited

U.S. PATENT DOCUMENTS

| | | | |
|---|---|---|---|
| 9,658,910 B2 * | 5/2017 | Poola ..................... | G06F 11/34 |
| 10,872,087 B2 * | 12/2020 | Guo ......................... | G06N 7/01 |
| 11,106,442 B1 | 8/2021 | Hsiao et al. | |
| 11,256,719 B1 * | 2/2022 | Saxena ............... | G06F 16/2365 |
| 11,769,087 B2 | 9/2023 | Somashekairah et al. | |
| 2018/0089328 A1 | 3/2018 | Bath et al. | |
| 2019/0095478 A1 | 3/2019 | Tankersley et al. | |
| 2019/0113259 A1 * | 4/2019 | Levin .................... | F25B 17/086 |
| 2019/0114343 A1 * | 4/2019 | Guo ......................... | G06N 7/01 |
| 2019/0236149 A1 | 8/2019 | Kuruvada et al. | |
| 2021/0125725 A1 | 4/2021 | Allen et al. | |

(Continued)

FOREIGN PATENT DOCUMENTS

WO     2023080321 A1     5/2023

OTHER PUBLICATIONS

Accuracy Evaluation of Overlapping and Multi-resolution Clustering Algorithms on Large Datasets (Year: 2019).*

(Continued)

*Primary Examiner* — Kim T Nguyen
(74) *Attorney, Agent, or Firm* — Kilpatrick Townsend & Stockton LLP

(57) ABSTRACT

Techniques for processing a large dataset to extract information from the dataset, where the processing is performed by multiple systems and where the entire dataset, due to its size, cannot be loaded into the memory of any one of the multiple systems. In certain implementations, the information extracted from the dataset is in the form of a set of one or more statistical metrics computed for the dataset. For example, the dataset may include datapoints related to a machine-learning (ML) model, and a metric value can be computed for the ML model based upon the dataset datapoints. The metric value may, for example, be a metric that measures the performance of the ML model.

20 Claims, 9 Drawing Sheets

(56) References Cited

U.S. PATENT DOCUMENTS

| | | |
|---|---|---|
| 2023/0014551 A1 | 1/2023 | Chang et al. |
| 2023/0162049 A1 | 5/2023 | Hall et al. |
| 2023/0186144 A1 | 6/2023 | Lopatecki et al. |
| 2023/0409524 A1* | 12/2023 | Bhattacharya .......... G06F 16/16 |
| 2024/0295974 A1 | 9/2024 | Badii et al. |
| 2024/0298294 A1* | 9/2024 | Feng ........................ G06T 7/73 |
| 2024/0320231 A1* | 9/2024 | Bhattacharjee ....... G06F 9/5066 |

OTHER PUBLICATIONS

"Built by ML Practitioners, for ML Practitioners", Available online at: https://arize.com/platform-overview/, 2023, 2 pages.

"Handling Large Datasets in Pandas (Memory Optimisation)", Available online at: https://www.scaler.com/topics/pandas/handling-large-datasets-in-pandas/, Oct. 2023 11 pages.

"Multi-output Classification Example with MultiOutputClassifier in Python", Available Online at: https://www.datatechnotes.com/2020/03/multi-output-classification-with-multioutputclassifier.html, Mar. 4, 2020, 3 pages.

"Multi-Output Classification with Machine Learning", Available Online at: https://www.section.io/engineering-education/multi-output-classification-with-machine-learning/, Jan. 21, 2022, 11 pages.

"Multioutput Regression", Available Online at: https://scikit-learn.org/stable/modules/multiclass.html#multioutput-regression, 2009, 2 pages.

"What is ML Observability", Available online at: https://docs.arize.com/arize/what-is-ml-observability, 2023, 2 pages.

"WhyLabs AI Observability", Available online at: https://docs.whylabs.ai/docs/, 2023, 4 pages.

Cloud, "Using Tensorflow Datasets and Estimators with More Data than RAM", Available online at: https://saturncloud.io/blog/using-tensorflow-datasets-and-estimators-with-more-data-than-ram/, Jul. 6, 2023, 4 pages.

Heydarian et al., "MLCM: Multi-Label Confusion Matrix", IEEE Access, vol. 10, Feb. 11, 2022, pp. 19083-19095.

Karajgi, "Evaluating Multi-Label Classifiers", Available Online at: https://towardsdatascience.com/evaluating-multi-label-classifiers-a31be83da6ea, Nov. 2, 2021, 26 pages.

Khammal, "Apache Spark and Data Observability a Technical Deep Dive", Available online at: https://www.kensu.io/blog/apache-spark-and-data-observability-a-technical-deep-dive, 2023, 3 pages.

Krasoulis et al., "Myoelectric Digit Action Decoding with Multi-output, Multi-class Classification: An Offline Analysis", Scientific Reports, vol. 10, Oct. 9, 2020, 10 pages.

Nguyen et al., "Azureml Observability: a Scalable and Extensible Solution for ML Monitoring and Drift Detection", Available online at: https://techcommunity.microsoft.com/t5/ai-machine-learning-blog/azureml-observability-a-scalable-and-extensible-solution-for-ml/ba-p/3474066, Jun. 14, 2022, 18 pages.

Ramanujam et al., "MLMO-HSM: Multi-label Multi-output Hybrid Sequential Model for Multi-resident Smart Home Activity Recognition", Journal of Ambient Intelligence and Humanized Computing, vol. 14, Dec. 11, 2022, pp. 2313-232.

Rosebrock, "Keras: Multiple Outputs and Multiple Losses", Available Oline at: https://pyimagesearch.com/2018/06/04/keras-multiple-outputs-and-multiple-losses/, Jun. 4, 2018, 32 pages.

Sen, "Ensemble Modeling for Neural Networks using large datasets—Simplified", Available online at: https://www.analyticsvidhya.com/blog/2021/10/ensemble-modeling-for-neural-networks-using-large-datasets-simplified/, Nov. 9, 2021, 9 pages.

Tariq, "What is the Difference Between Micro and Macro Averaging?", Available Online at: https://www.educative.io/answers/what-is-the-difference-between-micro-and-macro-averaging, Accessed from Internet on Oct. 30, 2023, 4 pages.

Tuychiev, "Comprehensive Guide to Multiclass Classification Metrics", Available Online at: https://towardsdatascience.com/comprehensive-guide-on-multiclass-classification-metrics-af94cfb83fbd, Jun. 9, 2021, 11 pages.

Wang et al., "Consistent Classification with Generalized Metrics", Department of Computer Science, University of Illinois at Urbana-Champaign, Aug. 24, 2019, 26 pages.

Xu et al., "A Survey on Multi-output Learning", Available Online at: https://arxiv.org/pdf/1901.00248.pdf, Oct. 13, 2019, pp. 1-21.

U.S. Appl. No. 18/678,996, Non-Final Office Action mailed on Feb. 10, 2025, 10 pages.

\* cited by examiner

APPROXIMATE METRIC FOR DATASET USING REPRESENTATIVE SUBSET

CROSS-REFERENCE TO RELATED APPLICATION

The present application is a non-provisional application of and claims the benefit and priority under 35 U.S.C. 119(e) of Indian Provisional Application No. 202341089847, filed Dec. 29, 2023, which is incorporated by reference herein in its entirety.

FIELD

The present disclosure relates to novel techniques for processing a large dataset to extract information from the dataset, where the processing is performed by multiple systems and where the entire dataset, due to its size, cannot be loaded into the memory of any one of the multiple systems. In certain implementations, the information extracted from the dataset is in the form of a set of one or more statistical metrics that are computed for the dataset.

BACKGROUND

Over the years, the data being emitted from different systems has grown exponentially, as the computing power of infrastructures and networks have grown. With the introduction of newer distributed systems, service-oriented architecture, and cloud technologies, systems can process thousands, or more, of service request per second, generating an equivalent amount of data. As a result of the generation such large datasets, there is an ever increasing need to analyze large datasets and extract information from the datasets in various different domains and applications.

For example, in the field of artificial intelligence (AI) and machine learning (ML), data scientists and data engineers commonly gather large amounts of data related to ML models and have to analyze this data to understand the data. Processing and understanding data can include validating correctness of the data, extracting information that summarizes the data, determining a shape of overall distribution of data, determining the performance of a model, and the like. The metrics can facilitate multiple processes in machine-learning tasks such as extracting correct data, understanding seasonality of the data, determining representation of categories, calculating performance of a model, etc. Additionally, data metrics can also provide useful information of changes in data over a period of time. Statistical metrics can be or include an integral part of machine-learning activities, and generating accurate metrics, fast can be an invaluable tool of any data scientist. A data scientist thus typically has to compute metrics for very large datasets, which may be generated by different cloud services, systems, and frameworks that use ML models.

For computing a statistical metric for a dataset, most existing statistical metric calculation algorithms assume that the entire dataset to be processed, and for which a metric is to be computed, can be all loaded and is available in the system memory (e.g., RAM) of a system responsible for calculating the statistical metric. However, for massive amounts of data, this may not be possible, even with very powerful systems. The system memories of the computing systems being used to perform the processing are not large enough to accommodate entirety of such datasets. It can also be expensive and cost prohibitive to buy systems with very large memory and processing resources. This greatly limits the amount of data that can be processed. Some techniques try to overcome the memory limitation by performing the computation in a linear manner using small chunks of data. This however makes the entire process have a linear complexity of calculating the metric with the volume of data, causing the total time to process and calculate a metric from data to drastically increase. For example, the amount of time needed to process the data increases proportionally with the increase in data size until the system runs out of memory and the processing crashes.

While there are some limited specialized algorithms and data structures, such as sketches, AWS PyDequ, and Whylogs, for processing large amounts of data in a distributed manner, these specialized algorithms are very limited in their applicability. The specialized algorithms are generally highly specialized and limited in their ability to handle just a few particular specialized metrics. There are several metrics that cannot be calculated using the existing limited techniques. Also, the way to use the specialized algorithms is complicated with complex interfaces, which can make it very difficult for a data scientist to use. Computing metrics for large amounts of data is, thus, a technically complex operation.

BRIEF SUMMARY

The present disclosure relates to novel techniques for processing a large dataset to extract information from the dataset, where the processing is performed by multiple systems and where the entire dataset, due to its size, cannot be loaded into the memory of any one of the multiple systems. In certain implementations, the information extracted from the dataset is in the form of a set of one or more statistical metrics computed for the dataset.

For example, in one use case, the dataset may include data associated with one or more machine learning (ML) models, such as predictions made by an ML model for a large set of datapoints, and the information to be extracted from the dataset may be a set of one or more metrics related to the ML model. The metric may, for example, be a metric that measures the performance of the ML model. These metrics may include, for example, a precision metric, an accuracy metric, a recall metric, and others.

A novel architecture and novel techniques are disclosed for extracting such information from a large dataset, for example, for computing metrics from data associated with one or more ML models. Unlike conventional techniques that process such larger datasets linearly, using the architecture and techniques described herein, the processing of the dataset can be performed in parallel thereby significantly reducing the amount of time needed to perform the processing. For example, at least a portion of the various processing involved in generation of a metric can be performed in a parallel distributed manner. Parallel processing can enable the metric to be computed efficiently in a very fast manner such as within the time thresholds or limits identified in a service agreement. The computation of the metric is achieved without having to load the entire input data into the memory of a single computer.

The present disclosure relates to machine-learning models, and more particularly to generating performance metrics for machine-learning models and/or other suitable models or algorithms using representative subsets. In some examples, a final representative subset can be generated based on a received dataset using, for example, data partitioning, data stratification, a binning algorithm, and the like. The final representative subset can be generated by partitioning the received dataset and by iteratively sampling and merging subsets of the dataset to generate the final representative subset. In some examples, a first distribution function associated with the dataset may be similar to identical to a second distribution function associated with the final representative subset. For example, the first distribution function may be approximately equal to the second distribution function. A first particular metric of the dataset can be approximated by determining second particular metric for the final representative subset. For example, the second particular metric may be approximately equal to the first particular metric since the second distribution function may be approximately equal to the first distribution function.

According to certain embodiments, a method can be used to output a particular metric for a received dataset. The method can be performed by a set of data processing systems. The method can include, for an input dataset for which a metric is to be computed, partitioning the input dataset into a set of non-overlapping partitions, each partition in the set of non-overlapping partitions including a set of data points from the input dataset. For each data processing system in the set of data processing systems, a size of the input dataset is larger than a system memory associated with the data processing system. The method can include, for each partition in the set of non-overlapping partitions, identifying a representative subset for the partition. The representative subset for a partition includes a subset of data points selected from the set of data points in the partition. The method can include iteratively merging the representative subsets identified for the set of non-overlapping partitions until there is a single subset. The method can include computing a value for the metric using the data points in the single subset. The method can include outputting the metric value.

In certain embodiments, each partition of the set of non-overlapping partitions is transmitted to a different data-processing system of the set of data-processing systems.

In certain embodiments, the representative subset approximates the data points included in the partition, the representative subset is included in a set of representative subsets, and the set of representative subsets corresponds to the set of non-overlapping partitions.

In certain embodiments, the computed value is an approximate value for the metric for the input dataset.

In certain embodiments, identifying a representative subset for each partition in the plurality of partitions includes: (a) performing processing by a first data processing system from the set of data processing system in which the performing processing by the first data processing system comprises: (i) receiving, by the first data processing system, a first partition of the set of non-overlapping partitions; and (ii) selecting, by the first data processing system, a first representative subset of datapoints from the datapoints in the first partition; (b) performing processing by a second data processing system from the set of data processing system in which the performing processing by the second data processing system comprises: (i) receiving, by the second data processing system, a second partition of the set of non-overlapping partitions; and (ii) selecting, by the second data processing system, a second representative subset of datapoints from the datapoints in the second partition in which the processing performed by the first data processing system is performed concurrently with the processing performed by the second data processing system.

In certain embodiments, the computer-implemented method can additionally include merging the first representative subset and the second representative subset to identify a third representative subset. Merging the first representative subset and the second representative subset includes identifying, from the first representative subset of datapoints and the second representative subset of datapoints, a third representative subset of datapoints. A datapoint in the third representative subset of datapoints is in the first representative subset of datapoints or in the second representative subset of datapoints. Merging the first representative subset and the second representative subset to identify the third representative subset is performed by a third data processing system from the set of data processing systems.

In certain embodiments, the first representative subset is representative of a first partition or of a first merged dataset of previously merged representative subsets. The second representative subset is representative of a second partition or of a second merged dataset of previously merged representative subsets.

In certain embodiments, the input dataset includes datapoints related to a machine-learning model, and the metric is a metric associated with the machine-learning model.

In certain embodiments, the metric measures a performance of the machine-learning model, and the metric is an accuracy metric, a precision metric, or a recall metric.

In certain embodiments, the computer-implemented method additionally includes determining whether to train the machine-learning model based upon the value computed for the metric.

In certain embodiments, the computer-implemented method further comprises receiving the input dataset as a stream.

The foregoing, together with other features and embodiments will become more apparent upon referring to the following specification, claims, and accompanying drawings.

DETAILED DESCRIPTION

Figure 1:
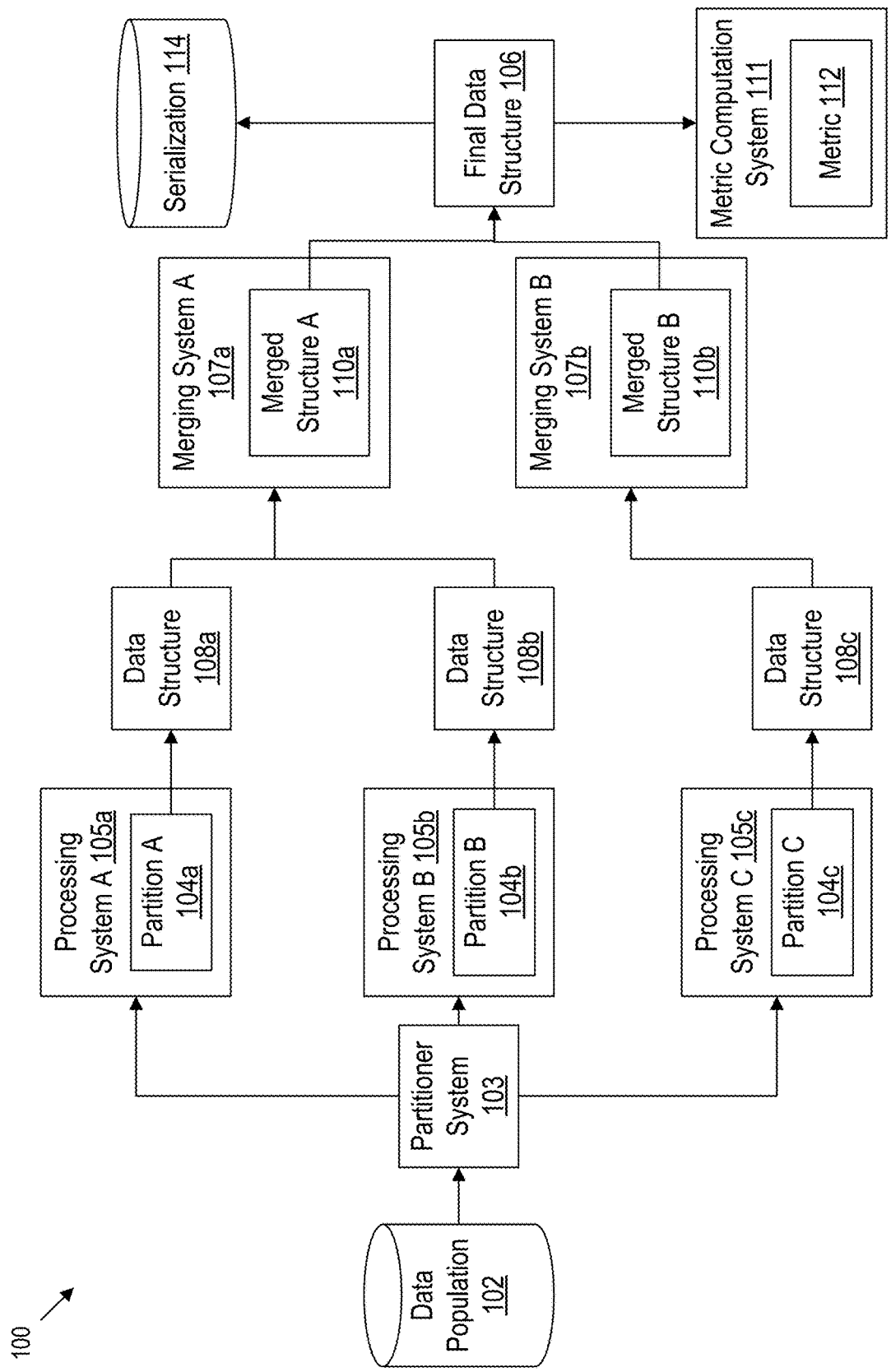
FIG. 1 is a flow diagram of data flow for generating an approximate metric for a dataset by partitioning the dataset and generating a final representative subset based on representative subsets of the partitions, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to novel techniques for processing a large dataset to extract information from the dataset, where the processing is performed by multiple systems and where the entire dataset, due to its size, cannot be loaded into the memory of any one of the multiple systems. In certain implementations, the information extracted from the dataset is in the form of a set of one or more statistical metrics computed for the dataset.

For example, in one use case, the dataset may include data associated with one or more machine learning (ML) models, such as predictions made by an ML model for a large set of datapoints, and the information to be extracted from the dataset may be a set of one or more metrics related to the ML model. The metric may, for example, be a metric that measures the performance of the ML model. These metrics may include, for example, a precision metric, an accuracy metric, a recall metric, and others.

A novel architecture and novel techniques are disclosed for extracting such information from a large dataset, for example, for computing metrics from data associated with one or more ML models. Unlike conventional techniques that process such larger datasets linearly, using the architecture and techniques described herein, the processing of the dataset can be performed in parallel thereby significantly reducing the amount of time needed to perform the processing. For example, at least a portion of the various processing involved in generation of a metric can be performed in a parallel distributed manner. Parallel processing can enable the metric to be computed efficiently in a very fast manner such as within the time thresholds or limits identified in a service agreement. The computation of the metric is achieved without having to load the entire input data into the memory of a single computer.

While the various examples and embodiments described in this disclosure are related to datasets associated with ML models and computing performance metrics for the datasets, this is not intended to be limiting. The novel architecture and techniques described herein can be used to compute various different types of other statistical metrics for various different datasets that are not related to ML models. A generalized distributed architecture and associated and associated techniques are disclosed for computing one or more statistical metrics a large dataset where the dataset cannot all be loaded into the memory of any computing system available for computing the metrics.

As described in this disclosure, processing of large amounts of data is achieved optimally using various technologies like partitioning, specialized data structures, and novel techniques for computing metrics. The architecture and techniques described herein results in very accurate results being computed in a much faster calculation time when compared to using traditional techniques.

Various embodiments are described herein, including methods, systems, non-transitory computer-readable storage media storing programs, code, or instructions executable by one or more processors, and the like. Some embodiments may be implemented by using a computer program product, comprising computer program and/or instructions that, when executed by a processor, cause the processor to perform any of the methods or processes described in the disclosure.

The techniques described herein are suitable for computing metrics for data that is too large to fit in the memory of a single computer system involved in computation of the metrics. It is suitable, for example, for processing data received via data streams, where datapoints to be processed are continuously streamed. The techniques described herein can enable metrics to be computed for such large data using computer systems with limited memory resources. Memory may be limited compared to an amount of data that is to be processed or analyzed. For example, the size of the data to be processed may be multiple thousand terabytes or more of data.

The input dataset to be processed may be received from one or more data sources. In certain implementations, the dataset may be received in the form of a data stream. The contents of the received dataset can vary based upon the specific use case. For example, the received dataset can include data generated by or associated with a machine-learning model, an artificial intelligence model, or the like. In some instances, the dataset may be in the form of, or may include, key-value pairs.

In certain implementations, the processing involves partitioning the input dataset for which a metric is to be computed into multiple partitions and distributing the partitions to multiple data processing systems for processing. The size of each partition is such that the entire data in the partition is able to fit in and be loaded into a system memory (e.g., RAM) of a data processing system processing the partition. For example, from the multiple data processing systems responsible for processing the dataset and computing a metric for the dataset, a first data processing system may receive the large dataset to be processed. The first data-processing system may partition the received data into multiple non-overlapping, or disjoint or disjoined, partitions, and may communicate each partition to a data-processing system from the multiple data processing systems. In this manner, partitions may be communicated by the first data-processing system to multiple other data-processing systems.

A data processing system receiving a partition then processes the partition. This processing involves performing data stratification and sampling the stratified data to identify a subset of the partition data in such a way that the frequency distribution of the selected subset is similar or identical to or is close to the frequency distribution of the data in the partition data. A subset is thus identified for each data partition, where the subset includes a subset of the datapoints included in the partition data. A subset is identified for each partition dataset. For example, a first representative subset is generated for a first partition by a first data processing system, a second representative subset is generated for a second partition by a second data processing system, a third representative subset for a third partition is generated by a third data processing system, and so on. In some examples, automatic stratification, or binning, can be performed to generate a nearly identical distribution function $F^*$ for a subset with respect to a distribution function $F$ for a corresponding partition in which $F^*(P_i^*) \sim F(P_i)$. Additionally, $P_i^* \subseteq P_i$ for all $i=1 \ldots n$.

A data-processing system receiving a partition is configured to process the partition data and generate or compute a summary or representation of the partition data such as a representative subset. In this manner, multiple representations of the partition data are generated by the data-processing systems receiving the partitions. The processing performed by a data-processing system in generating the representative subset for the partition can involve various different processing steps. In certain implementations, the processing involves performing a stratification of the data using a distribution function. Performing the stratification can involve using a binning algorithm to identity a number of bins, or strata, for the partition, allocating the data points in the partition into the bins based upon the values of the data points, and using the bins to identify a subset of data points from the data points in the partition. In certain implementations, the number of bins may be similar or identical among the partitions, and endpoints defining each bin of the number of bins may be similar or identical among the partitions. In other embodiments, the number of bins may differ among the partitions, the endpoints may be different among the partitions, or a combination thereof. In certain implementations, identifying the subset involves sampling and selecting a preconfigured number of data points from each bin. The selected subset of data points from the partition may be or include the representative subset for the partition.

The representative subsets generated for the partitions are then iteratively merged until a single merged representation, such as a final representative subset, is generated that represents the entire dataset for which one or more metrics are to be computed. For example, a first representative subset generated for a first partition may be merged with a second representative subset generated for a second partition to create a first merged subset that is representative of the first partition and the second partition. The first merged subset may include each data point included in the first representative subset and the second representative subset. For example, the data points included in the first representative subset may be combine with the data points included in the second representative subset to generate the first merged subset. In some examples, not all of the data points of each of the first representative subset and the second representative subset may be included in the first merged subset. For example, the data points included in the first representative subset and the second representative subset, either after being combined or before and/or without first being combined, can be sampled to cause a subsequent set of data points, which form the first merged subset, to have a similar or identical frequency distribution to a combined frequency distribution of the first representative subset and the second representative subset.

A third representative subset generated for a third partition may be merged with a fourth representative subset generated for a fourth partition to create a second merged subset representing the third partition and the fourth partition. Two merged representative subsets may themselves be merged to generate another merged representative subset. Merging can occur between two (or more) representative subsets generated for partitions, two merged representative subsets, or a representative subset generated for a partition and a merged representative subset. In certain implementations, the merging continues until a final single merged subset that is representative of the entire dataset. The final representative subset can then be used to calculate the metric for the entire dataset.

In certain implementations, merging of two subsets involves performing data stratification and sampling the stratified data from the two subsets being merged to identify a subset of data points from the two subsets in such a way that the frequency distribution of the identified subset is similar or identical to or is close to the frequency distribution of the data points in the two (or more) subsets being merged. A merged subset thus identified includes a subset of the datapoints included in the subsets being merged.

In certain implementations, a unique data structure can be provided to facilitate the partitioning, processing of the partitions, and the merging operations. The special data structure may provide data members for storing the partitioned data, for storing subsets, and any associated metadata. The special data structure may also provide functions and methods, which can be called by the data processing systems performing the processing, for performing the partitioning, subset selection, merging, and metrics computation operations. The data structure may also be serializable. The data structure can facilitate storage of a merged representation. As indicated above, and in certain implementations, the merging continues until a final single merged representation is obtained for the entire dataset for which a metric is to be computed. Thus, merging continues until a single final data structure is obtained that stores the merged representation for the entire data set. A data-processing system can compute a metric for the entire dataset using the data stored by the final data structure. The final single merged representation can be used to calculate the metric.

The present disclosure involves a generalized distributed solution for computing metrics for large data sets that are not encumbered by the problems inherent with existing solutions as discussed in the Background section. In certain embodiments, techniques can involve processing large amounts of data optimally to generate metrics using technologies like partitioning, iterative stratification and merging, multi-node clusters, and the like. The techniques described herein may be used to calculate statistical metrics for data and performance metrics for machine-learning model evaluation based on large amounts of data in which the data to be processed may be too large to be loaded into the memory of any single data processing system available for performing the processing. The techniques described herein can be used to compute the metrics in an efficient and fast manner, such as within time thresholds specified in service level agreements (SLAs) promised by a cloud services provider (CSP) for its customers, where the customers may subscribe to one or more cloud services provided by the CSP.

The processing described herein is performed by multiple data processing systems. Certain processing can be performed in parallel. A data processing system may perform different processing tasks, including partitioning, selecting a representative subset for a partition, merging to form a merged subset, and computing a metric using the final merged subset. In certain implementations, specialized data processing system may be provided for performing the individual tasks.

In certain implementations, the processing performed is described herein and the architecture used for implementing the processing can be based upon the following implementation. The input to the system is a large dataset for which a metric is to be computed, where the size of the data is larger than the system memory associated with any data processing system that is available for performing the processing. This large dataset can be referred to as a population of data P. This population of data P can be partitioned to a number of disjoint, or otherwise non-overlapping, partitions (or partitioned datasets) P1 ... $P_i$ in which:

$$P1 \cup P2 \ldots \cup P_i = P \text{ for } i=1 \ldots n; \text{ and}$$

$$P_i \cap P_j = \text{null for all } i,j \text{ for all } i,j=1 \ldots n \text{ and } i!=j$$

Based on the above, and given that F(P) is the frequency distribution function for P and that $F(P_i)$ is the frequency distribution function of each of the partitions $P_i$:

$$F(P1) \cup F(P2) \ldots \cup F(P_i) = F(P), \text{for } i=1 \ldots n$$

The above holds true because:

$$F(P1 \cup P2 \ldots \cup P_i) = F(P)$$

Based upon the above, the following can be hypothesized, where Met(X) denotes a statistical metric generated for any data set X:

If $P_i^* \subseteq P_i$ for all $i=1 \ldots n$, and $P^* \subseteq P$, then $F(P1^*) \cup F(P2^*) \ldots \cup F(P_i^*) = F(P^*)$, where, $F(P^*) \sim F(P)$, and $Met(P^*) \sim Met(P)$.

then $\cup Met(P_i^*) = Met(P^*) \sim Met(P)$

As used in the above, P* is a subset of P, which can be or include the received data to be processed, and $P_i^*$ is a representative subset of a corresponding partition $P_i$. In this manner, the metric for the dataset X, which is an approximate metric for the dataset, can be determined without having to load all the input data set into a memory of a data processing system. This enables dataset X to be processed and the statistical metric for dataset X to be computed using data processing systems with memories that individually cannot fit into their system memories the entire dataset X.

FIGS. 1-4 describe examples and embodiments related to an architecture and techniques that can be used to generate an approximate metric. FIGS. 5-8 depict examples of architectures for implementing cloud infrastructures for providing one or more cloud services, where the infrastructures may incorporate teachings described herein. FIG. 9 depicts a block diagram illustrating an example of a computer system or device, according to at least one embodiment.

Along with the ability to calculate the performance metrics, novel techniques are also described for performing the computation for generating a metric by approximating the metric using partitioned, stratified/binned, and iteratively merged data. A novel technique that is implemented using an architecture for generating a final representative subset to approximate the metric for the received dataset is provided. As a result of the novel computation techniques described herein, and in certain implementations, the metric can be generated on any arbitrary amount/size of data without regard to available memory.

FIG. 1 is a distributed environment 100 for generating an approximate metric for a dataset by partitioning the dataset and generating a final representative subset based on representative subsets of the partitions, according to at least one embodiment. The distributed environment 100 that enables the metric to be computed by approximation is illustrated in FIG. 1.

In some examples, FIG. 1 is a simplified block diagram of the distributed environment 100 incorporating an exemplary embodiment. The distributed environment 100 may comprise multiple systems communicatively coupled to each other via one or more communication networks. The systems in FIG. 1 include a partitioner system 103, processing systems 105a-c, merging systems 107a-b, and a metric computation system 111. The distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems or components than those shown in FIG. 1, may combine two or more systems, or may have a different configuration or arrangement of systems. Additionally or alternatively, the same data processing system can be used as a partition system, partition processing system, merging system, or the like. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium such as on a memory device.

As illustrated in FIG. 1, there may be multiple distributed processing nodes that are configured to perform processing in parallel. The input data, which is referred to as data population 102 in FIG. 1, may be partitioned in multiple partitions or chunks based upon the number of available processing nodes for processing partitions. The input data may include multiple data points, and in certain use cases, the data population may be received as part of a data stream.

As illustrated in FIG. 1, the data population 102 can be ingested into a partitioner system 103, for example as a stream. The partitioner system 103 can receive the data population 102 as input and can partition the data population 102 into multiple partitions such as partition A 104a partition B 104b, and partition C 104c. The multiple partitions can be communicated to processing systems, such as processing system A 105a, processing system B 105b, and processing system C 105c, to be processed. The data population 102 can be partitioned into three partitions, with each processing system receiving one partition, though any other suitable numbers (e.g., less than three or more than three) of partitions are possible. For example, processing system 105a receives partition A 104a, processing system 105b receives partition B 104b, and processing system 105c receives partition C 104c. The number of nodes and partitions can vary in different embodiments. A processing system receiving a partition may thus see only a portion of the data population 102. The partitioner system 103 creates an instance of a special data structure for each partition, and the partitioner system 103 populates the special data structure with data for the partition.

In certain implementations, a unique data structure can facilitate computations of the metric. The unique data structure can be or include a final representative subset (e.g., final data structure 106) of the data population 102. The processing systems can generate representative subsets for each subset of data of the data population 102. For example, and as illustrated FIG. 1, each of the processing systems can output a data structure or a representative subset that represents data provided to the respective processing system. For example, data structure 108a can be generated by processing system A 105a, data structure 108b can be generated by processing system B 105b, and data structure 108c can be generated by processing system C 105c. each of the data structures 108a-c can be generated as representative subsets of the corresponding partitions 104a-c. For example, processing system 105a can perform processing on partition A 104a to generate the data structure 108a, and so on.

The representative subsets can be merged to generate the final representative subset. The merging can happen in one step or via multiple successive merges. For example, and as illustrated in FIG. 1, the data structure 108a and the data structure 108b can be provided to merging system A 107a, and the data structure 108c can be provided to merging system B 107b. Merging system A 107a can merge the data structures 108a-b into merged data structure A 110a, and can then further merged with merged data structure B 110b, which can be generated by merging system B 107b based on the data structure 108c, to produce the final data structure 106. In some examples, a merging system can be a data processing system that can receive representative subsets, such as the data structures 108a-c, merged data structures, and the like, and can merge the inputs into another representative subset that represents the data corresponding to the received data structures. Merging can occur between two or more partition representative subsets (e.g., the data structures 108a-c), or between a partition representative subset and a merged subset such as the merged data structures. For example, each merging system can receive a partition or a data structure that stores partition data, and the merging system can perform processing on the received partition, can update the data structure, and/or can create a new data structure.

The final data structure 106, which may be a final representative subset that represents the data population 102, can be used to approximate the metric 112 for the dataset. For example, a metric computation system 111 can receive the final data structure 106, or any data included therein, and can compute a metric based at least in part on the final data structure 106. In this manner, the final result for the metric 112 of the machine-learning model can be approximated for the data population 102 (or the entire stream) without loading the entire stream into memory of a single processing node.

Due to the partitioning of the input data, it is possible that a particular partition received by a particular processing node may not have a distribution function similar or identical to the distribution function of the dataset. The unique data structure and the mergeable property of the data structure accounts for this. When two representative subsets are merged (e.g., when the data structure for the two results are merged), there is an additive affect for the distribution function. Thus, even if one node does not have a similar or identical distribution function, when the final result is computed from the merging, the final result (e.g., the final representative subset) has a distribution function that is a sufficient approximation of the distribution function of the dataset for the machine-learning model. The metric can include a micro performance metric value and/or a macro performance metric value for each performance metric.

Figure 2:
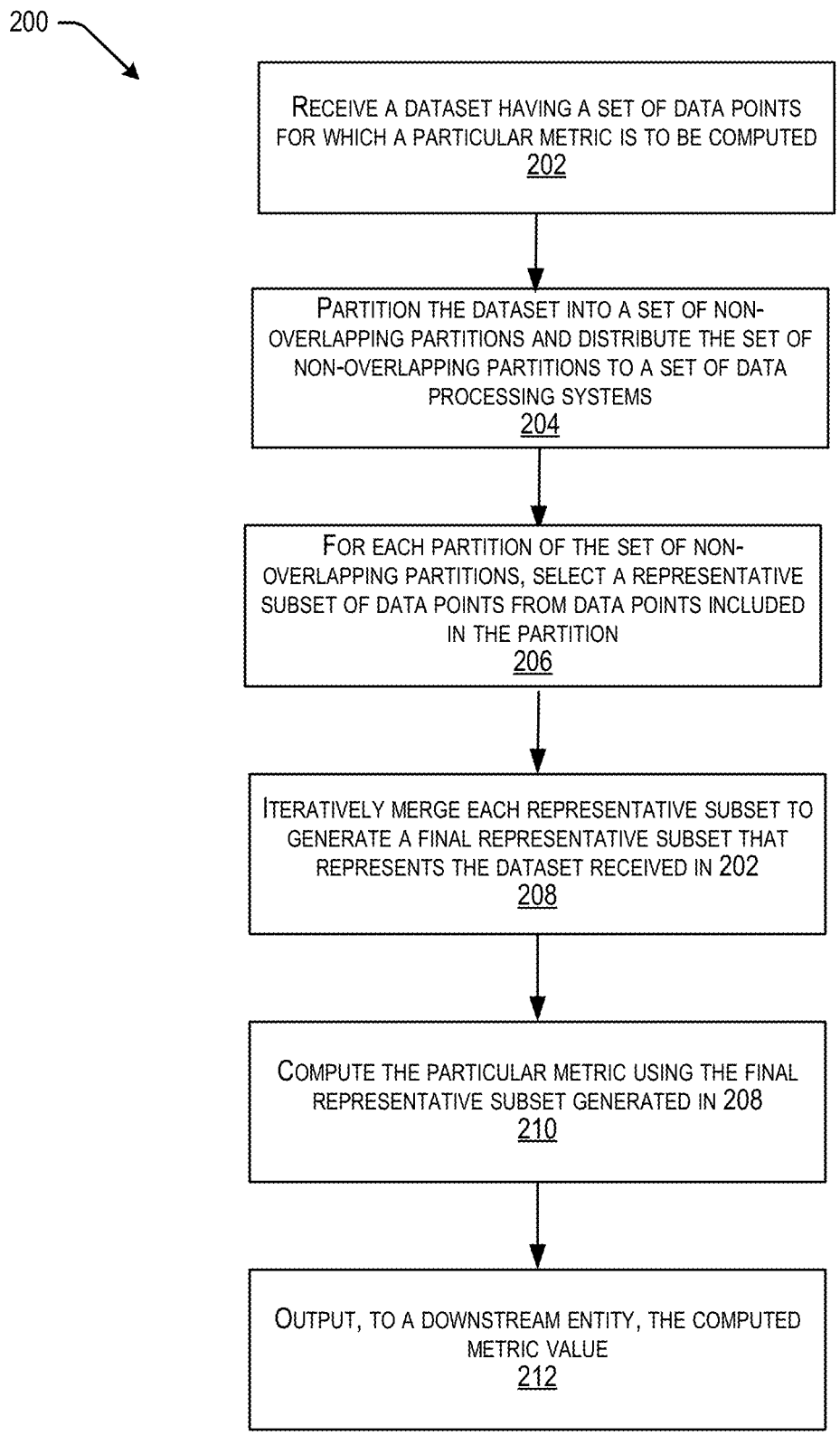
FIG. 2 is a flowchart of a process for generating an approximate metric for a dataset by partitioning the dataset and generating a final representative subset based on representative subsets of the partitions, according to at least one embodiment.

FIG. 2 is a flowchart of a process 200 for generating an approximate metric for a dataset by partitioning the dataset and generating a final representative subset based on representative subsets of the partitions. FIG. 2 depicts a simplified flowchart 200 depicting processing performed for generating an approximate metric according to certain embodiments. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium such as on a memory device. The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 2 may include a greater number or a lesser number of steps than those depicted in FIG. 2. In certain embodiments, such as in the embodiment depicted in FIG. 1, the processing depicted in FIG. 2 may be performed by the partitioner system 103, the processing systems 105a-c, the merging systems 107a-c, the metric computation system 111, or the like.

At 202, a dataset is received for which a particular statistical metric is to be computed. In some embodiments, the dataset may be received via a request from an entity, and the request may include or otherwise indicate the dataset and a request for a particular metric to be computed for the dataset. In other examples, the dataset may be received as part of a stream.

The dataset may include a set of data points, and, in some examples, the set of data may relate to a machine-learning model. The size of the data set may be too large to fit into the memory of available computing systems for computing the metric. The particular metric may be or include any suitable performance metric, health metric, or the like about the machine-learning model or about any other model, system, or the like associated with which the dataset is associated. Examples of metrics may include a recall metric, a precision metrics, etc., which are statistical metrics used for measuring the performance of a ML model.

At 204, the dataset is partitioned into non-overlapping or disjoint partitions, which are then distributed to a set of data-processing systems for processing. For example, each partition of the non-overlapping partitions may include a first subset of the set of data points that is different than, and that does not include any common data points, compared to a second subset of the set of data points of a different partition of the non-overlapping partitions. In some embodiments, the dataset may be partitioned into the non-overlapping partitions randomly or by some other techniques for distributing the set of data points among the non-overlapping partitions. Additionally or alternatively, each partition of the non-overlapping partitions may have the same or similar number of data points as other partitions of the non-overlapping partitions. In other embodiments, each partition of the non-overlapping partition may have a number of data points corresponding to an available memory of a corresponding data-processing system of the set of data-processing systems. Each data-processing system of the set of data-processing systems may have sufficient memory, processing power, and the like to load each data point included in a particular partition of the non-overlapping partitions that is provided to the data-processing system. For example, a particular data-processing system of the set of data-processing systems can receive a particular partition of the non-overlapping partitions, and the data-processing system may be configured to load each data point included in the particular partition into a system memory of the particular data-processing system.

At 206, and for each partition of the non-overlapping partitions, a representative subset is selected to generate a set of representative subsets. The representative subset may be or include a subset of data points included in the partition, and the representative subset may be selected from the data points included in the partition. For example, a particular partition of the non-overlapping partitions may include a particular dataset. The particular partition may be stratified or may otherwise undergo a binning process to stratify the particular dataset. A set of bins may be generated for the particular partition, or for the particular dataset included therein, and the particular dataset may be distributed among the set of bins. Data points can be sampled from the set of bins to select the representative subset. The representative subset may include fewer data points than the particular dataset. For example, if the particular dataset include 10,000 data points, then the representative subset may include 20 data points, 50 data points, 100 data points, 150 data points, 200 data points, or the like. In some embodiments, the representative subset may represent the particular dataset such that a first distribution function of the representative subset may be equal to, or at least approximately equal (e.g., within about 1%, within about 5%, within about 10%, within about 15%, etc.) to, a second distribution function of the particular dataset.

At 208, each representative subset of the set of representative subsets is iteratively merged with a different representative subset of the set of representative subsets. The set of representative subsets may be iteratively merged until a final representative subset is generated. The final representative subset may be representative of the dataset received at 202. For example, a first distribution function of the final representative subset may be equal to, or at least approximately equal (e.g., within about 1%, within about 5%, within about 10%, within about 15%, etc.) to, a second distribution function of the dataset received at 202.

In a particular example, the non-overlapping partitions may include six partitions, and the set of representative subsets may include six representative subsets: a first representative subset, a second representative subset, a third representative subset, a fourth representative subset, a fifth representative subset, and a sixth representative subset, though other suitable numbers of representative subsets are possible. The first representative subset may be merged with the second representative subset to form a seventh representative subset, the third representative subset and the fourth representative subset may be merged to form an eighth representative subset, and the fifth representative subset and the sixth representative subset may be merged to form an ninth representative subset. The seventh representative subset, the eighth representative subset, and the ninth representative subset may be stratified, sampled, and the like to reduce a number of data points in the respective datasets. For example, if the first representative subset and the second representative subset have 50 data points, the seventh representative subset may initially have 100 data points (e.g., from the union of the first representative subset and the second representative subset), and the seventh representative subset can be stratified, sampled, and the like to reduce the number of data points included in the seventh representative subset to 50 data points. The seventh representative subset may be merged with the eighth representative subset to form a tenth representative subset, which can again be stratified, sampled, and the like to reduce a number of data points included in the tenth representative subset. And, the ninth representative subset can be merged with the tenth representative subset to form an eleventh representative subset, which may be or include the final representative subset. In some embodiments, the eleventh representative subset may be stratified, sampled, and the like to form the final representative subset.

At 210, the particular metric is computed, for example as a particular metric value, using the final representative subset. In some embodiments, the final representative subset may have a first distribution function that may be similar or identical to a second distribution function of the dataset received at 202. Since the first distribution function is similar or identical to the second distribution function, then computed metric values for the final representative subset may be similar or identical to computed metric values for the dataset received at 202. Stated differently, a first set of computed metric values for the final representative subset can be an approximation of a second set of computed metric values for the dataset received at 202 since the first distribution function is similar or identical to the second distribution function. Thus, the particular metric computed for the final representative subset may be similar or identical to the particular metric computed for the dataset received at 202.

At 212, the particular metric is output to a downstream entity. The output particular metric may be the particular metric computed for the final representative subset, and the output particular metric may be presented as the particular metric for the dataset received at 202. For example, a responsive message can be provided based on the request described with respect to 202. The responsive message may include the particular metric computed for the final representative subset and presented as the particular metric computed for the dataset received at 202. The responsive message may be provided to the downstream entity via a user interface or via other suitable techniques for providing the responsive message and/or the particular metric. In some embodiments, the downstream entity may receive the responsive message and can adjust an operation of the machine-learning model. Adjusting the operation of the machine-learning model can include using the particular metric to adjust training weights and/or a training process for the machine-learning model.

In one possible examples, an input dataset can include multiple datapoints and may be: ID={A, B, C, D, . . . Z, 1, 2, 3, 4, . . . 100} in which ID is the input data set. The input dataset can be provided to a partitioner system, such as the partitioner system 103, that can generate multiple partitions based on ID. The multiple partitions can include, among many other possible partitions, a first partition, P1, a second partition, P2, and a third partition, P3, in which P1={A, B, C, D, E}, P2={F, G, H, I, J}, and P3={1, 2, 3, 4, 5, 6}. P1 can be provided to a first processing system, P2 can be provided to a second processing system, and P3 can be provided to a third processing system. The first processing system can process P1 to generate a first representative subset RP1, and the third processing system can process P3 into a second representative subset RP2, in which RP1={A, D} and RP2={2, 4}. RP1 and RP2 can be provided to a merging system to be merged to generate a subsequent representative dataset RP12. The merging system can generate RP12 as: RP12={A, D, 2, 4} in which the data points of RP1 are merged with the data points of RP2. Additionally or alternatively, the merging system, or other processing system, etc., can select a representative dataset, FRP, based on RP12 in which FRP={A, 2} and in which FRP has a frequency distribution similar or identical to a frequency distribution of P1 and P3.

Figure 3:
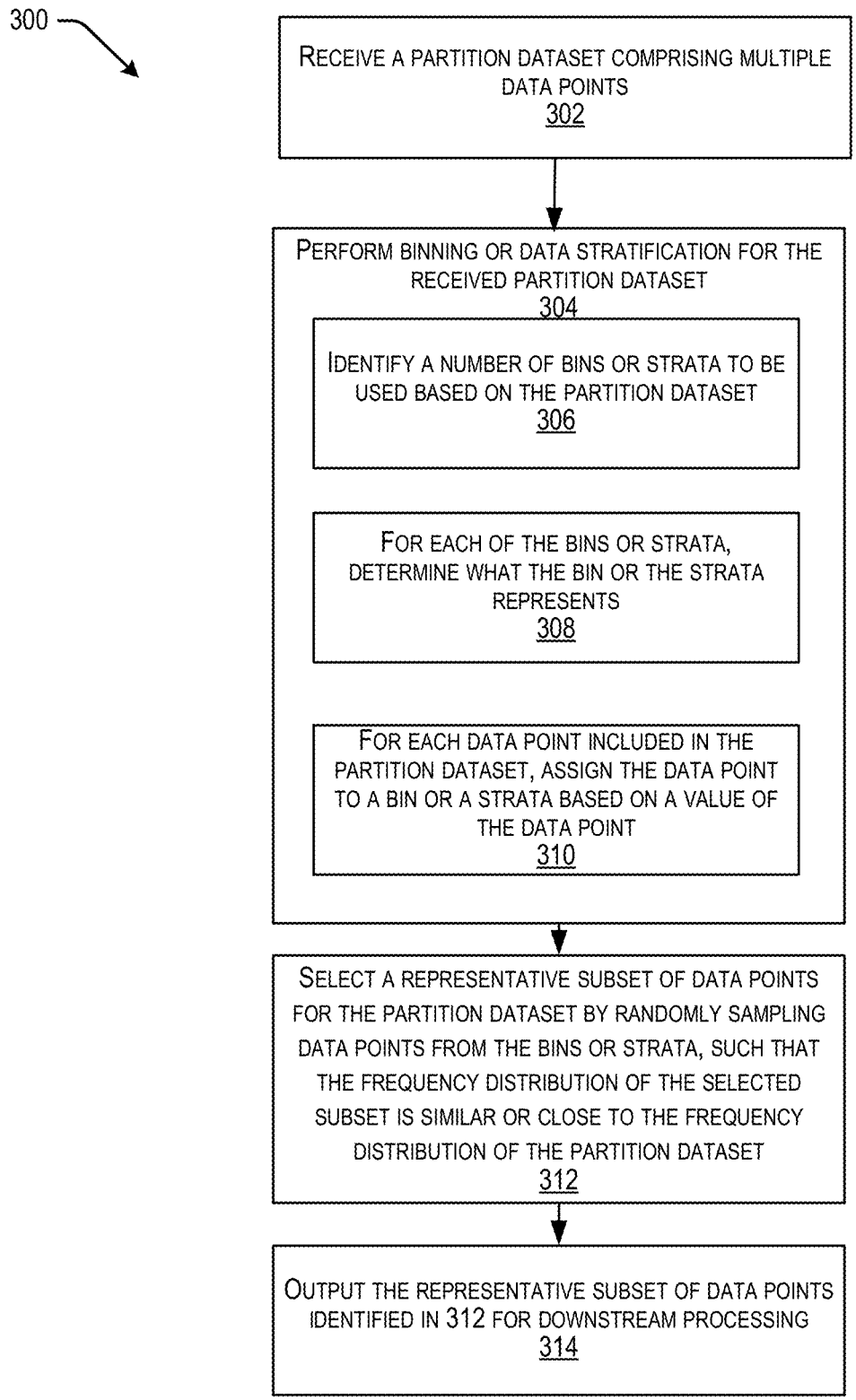
FIG. 3 is a flowchart of a process for generating a representative subset for a partition, according to at least one embodiment.

FIG. 3 is a flowchart of a process 300 for generating a representative subset for a partition.

At 302, a partition is received. The partition may be received by a data-processing system of a set of data-processing systems, and the partition may be or include a subset of a dataset received by a computing system. The partition may include a set of data points, and the data-processing system may be configured to load the entire set of data points of a system memory of the data-processing system.

At 304, binning or stratification is performed on the partition. For example, the set of data points may be binned or stratified based on automatic, or iterative, stratification and/or by using a particular binning algorithm. In some embodiments, the set of data points can be binned or stratified based on the techniques described with respect to 306, 308, and/or 310.

At 306, a number of bins or strata are identified to be used based on the set of data points included in the partition. The number of bins may be identified based on a volume of data included in the set of data points. For example, as the volume of data included in the set of data points increases, then the number of bins may also increase. Additionally or alternatively, the number of bins may be identified based on categories and/or numerical ranges indicated by the set of data points. For example, if the set of data points includes categorical data, then the number of bins may be identified to be a first number that is equal to a second number of types of categories indicated by the set of data points. If the set of data points includes numerical data, then the number of bins may be identified to be a first number that facilitates approximately equally sized bins having predetermined numerical ranges. A combination of the foregoing is possible.

At 308, and for each bin included in the number of bins, what the bin represents can be determined. What the bins represent depends upon whether the dataset for which the metric is to be computed is categorical (e.g., has categorical values) or is numerical (e.g., has numerical values). For categorical data, each bin identified in 306 represents a category or a set of categories. For example, if the data is categorical and the values for the categories are selected from a set of categories {Excellent, Good, Okay, Bad}, then four bins may be identified in 306, with the first bin representing "Excellent", the second bin representing "Good", the third bin representing "Okay", and the fourth bin representing "Bad".

If the set of data points has numerical values, then each bin identifies a range of values in which the range of the bin is non-overlapping with ranges of other bins identified in 306. For example, if the data set has associated values in the range of 1 to 100, then in certain use cases five bins may be identified in 306, with the first bin representing a range of 1-20, the second bin representing a range of 21-40, the third bin representing a range of 41-60, the fourth bin representing a range of 61-80, and the fifth bin representing a range of 81-100.

In the case of numerical data, various different techniques may be used to determine the number of bins in 306. For example, a modified Sturge's algorithm can be used where a number of bins $$b = \frac{(\max - \min)}{h}$$

where $h = \log_2(\text{partition value}) + 1$ in which max is the maximum value in the set of data points and min is the minimum value in the set of data point. An additional modification can be used where max and min can be included for the partition in the first bin and the last bin.

At 310, and for each data point included in the set of data points of the partition, the data point is assigned to a bin of the bins identified at 306. In some embodiments, the data point can be assigned to a particular bin of the bins based on a value of the data point. The value of the data point may include a particular category, a particular numerical value, or the like. If the data point has a particular category, then the data point may be assigned to a particular bin having the particular category. If the data point has a particular numerical value, then the data point may be assigned to a particular bin having a particular range including the particular numerical value.

At 312, a representative subset of data points is selected from the partition. In some embodiments, the representative subset of data points can be selected by randomly sampling and/or selecting a pre-configured number of data points from each bin. The pre-configured number may be predetermined prior to the sampling, may be adjustable based on a volume of the set of data points, or the like. In some embodiments, the representative subset of data points may include equal numbers of data points from each bin of the bins. In other embodiments, a sufficient number of data points may be sampled and/or selected from each bin of the bins to cause the representative subset of data points to be representative of the set of data points included in the partition. For example, a first distribution function of the representative subset may be equal to, or at least approximately equal (e.g., within about 1%, within about 5%, within about 10%, within about 15%, etc.) to, a second distribution function of the set of data points included in the partition.

At 314, the representative subset of data points is output as a representative subset for the partition. For example, the particular data-processing system can provide the representative subset to a computing system configured to generate a metric for an overall dataset, and the particular data-processing system can present the representative subset as the representative subset for the partition. The representative subset can be used to perform operations that may relate to approximating a metric, as illustrated and described with respect to FIG. 2 and the process 200.

Figure 4:
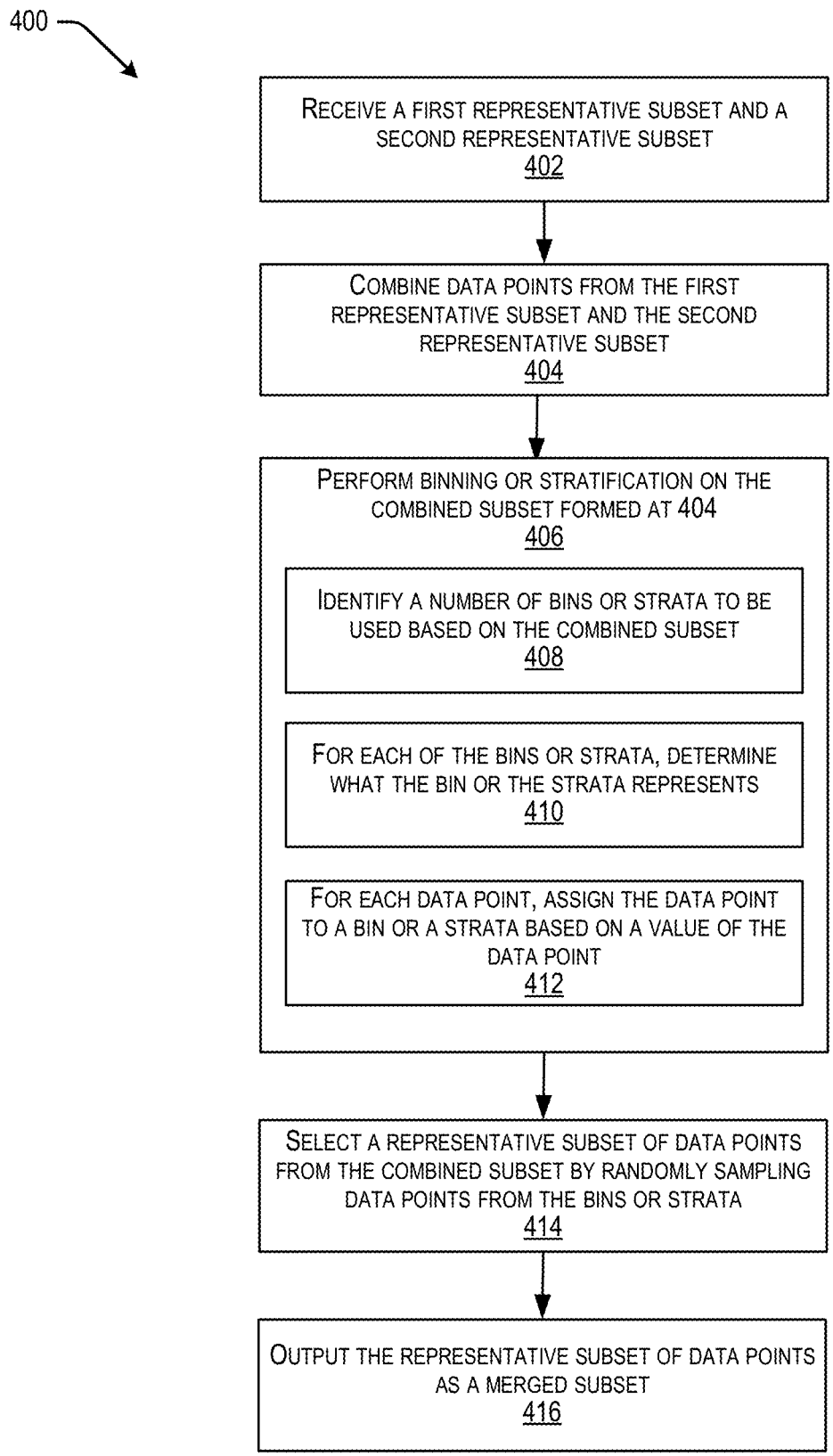
FIG. 4 is a flowchart of a process for iteratively merging representative subsets to form a final representative subset, according to at least one embodiment.

FIG. 4 is a flowchart of a process 400 for iteratively merging representative subsets to form a final representative subset.

At 402, a first representative subset and a second representative subset are received. The first representative subset may be associated with a first partition of a set of non-overlapping partitions, and the second representative subset may be associated with a second partition of the non-overlapping partitions. In some embodiments, the first representative subset and/or the second representative subset may be generated from a previously executed merging operation that may have merged representative subsets determined from partitions and/or even more previous merging operations. The first representative subset may have a first distribution function that is similar or identical to a distribution function of a first partition or a first pair of partitions associated with representative subsets merged to form the first representative subset. Additionally or alternatively, the second representative subset may have a second distribution function that is similar or identical to a distribution function of a second partition or a second pair of partitions associated with representative subsets merged to form the second representative subset.

At 404, data points included in the first representative subset and the second representative subset are combined into a combined subset. In some embodiments, the combined subset may be formed as a combination of the first representative subset and the second representative subset. A union operation may be performed on the first representative subset and the second representative subset to form the combined subset. For example, the combined subset may be or include a union of a first set of data points, which may be included in the first representative subset, and of a second set of data points, which be included in the second representative subset.

At 406, binning or stratification is performed on the combined subset formed at 404. For example, the first set of data points and the second set of data points may be binned or stratified based on automatic, or iterative, stratification and/or by using a particular binning algorithm. In some embodiments, the first set of data points and the second det of data points, which may form the combined subset, can be binned or stratified based on the techniques described with respect to 408, 410, and/or 412.

At 408, a number of bins or strata are identified to be used based on the combined subset. The number of bins may be identified based on a volume of data included in the combined subset. For example, as the volume of data included in the combined subset increases, then the number of bins may also symmetrically increase. Additionally or alternatively, the number of bins may be predetermined such as based on a memory capacity and/or a processing capacity of a data-processing system on which the combined subset is resident. In some embodiments, and for numerical data, a modified Sturge's algorithm can be used where a number of bins $$b = \frac{(\max - \min)}{h}$$

in which $h=\log_2(\text{partition value})+1$ in which max is the maximum value in the merged set of data points and min is the minimum value in the combined subset. An additional modification can be used in which max and min can be included for the combined subset in the first bin and the last bin.

At 410, and for each bin included in the number of bins, what the bin represents can be determined. For example, each bin of the number of bins can have a type or classification that can be "category" or "range," though other suitable classifications are possible for the bins. In a particular example, if the combined subset includes one or more data points having a categorical value, then the bin may be assigned a classification such as "category" and may be assigned a particular category. In another example, if the combined subset includes one or more data points having a numerical value, then the bin may be assigned a classification such as "range" and may be assigned a particular numerical value range.

At 412, and for each data point included in the combined subset, the data point is assigned to a bin of the bins identified at 408. In some embodiments, the data point can be assigned to a particular bin of the bins based on a value of the data point. The value of the data point may include a particular category, a particular numerical value, or the like. If the data point has a particular category, then the data point may be assigned to a particular bin having the particular category. If the data point has a particular numerical value, then the data point may be assigned to a particular bin having a particular range including the particular numerical value.

At 414, a representative subset of data points is selected from the combined subset. In some embodiments, the representative subset of data points can be selected by randomly sampling and/or selecting a pre-configured number of data points from each bin. The pre-configured number may be predetermined prior to the sampling, may be adjustable based on a volume of the combined subset, or the like. In some embodiments, the representative subset of data points may include equal numbers of data points from each bin of the bins. In other embodiments, a sufficient number of data points may be sampled and/or selected from each bin of the bins to cause the representative subset of data points to be representative of the combined subset. For example, a first distribution function of the representative subset of data may be equal to, or at least approximately equal (e.g., within about 1%, within about 5%, within about 10%, within about 15%, etc.) to, a second distribution function of the combined subset.

At 416, the representative subset of data points is output as a representative subset for a result of the operation described with respect to 404. For example, the particular data-processing system can provide the representative subset of data points to a computing system configured to generate a metric for an overall dataset, and the particular data-processing system can present the representative subset of data points as the representative subset for the merged dataset. The representative subset can be used to perform operations that may relate to approximating a metric, as illustrated and described with respect to FIG. 2 and the process 200. Additionally or alternatively, the representative subset can be merged with other representative subsets. For example, the operations described with respect to the process 400 can be iteratively executed until a final representative subset is generated or otherwise suitably until the merging operation can no longer be performed.

In certain embodiments, the techniques described with respect to FIGS. 1-4 can involve processing large amounts of data optimally to generate metrics using technologies like partitioning, iterative stratification and merging, multi-node clusters, and the like. The techniques described herein may be used to calculate statistical metrics for data and performance metrics for machine-learning model evaluation based on large amounts of data in which the data to be processed may be too large to be loaded into the memory of any single data processing system available for performing the processing. The techniques can be used to compute the metrics in an efficient and fast manner.

In certain embodiments, the metric approximation functionality, such as via partitioning, merging, and the like, may be offered as a cloud service by a cloud services provider (CSP) to its subscribing customers. In certain implementations, the functionality may be offered to subscribing customer under a Software-as-a-Service (SaaS) model. In some implementations, an Infrastructure-as-a-Service (IaaS) provider may offer the service as part of its infrastructure offerings. The following section describes an IaaS implementation that may offer various cloud services to subscribing customers. The metric approximation functionality disclosed in this disclosure may be offered as one of the cloud services.

Examples of Architectures for Implementing Cloud Infrastructures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to be set up first. In some instances, the provisioning can be done manually, a provisioning tool may be utilized to provision the resources, and/or deployment tools may be utilized to deploy the code once the infrastructure is provisioned.

Figure 5:
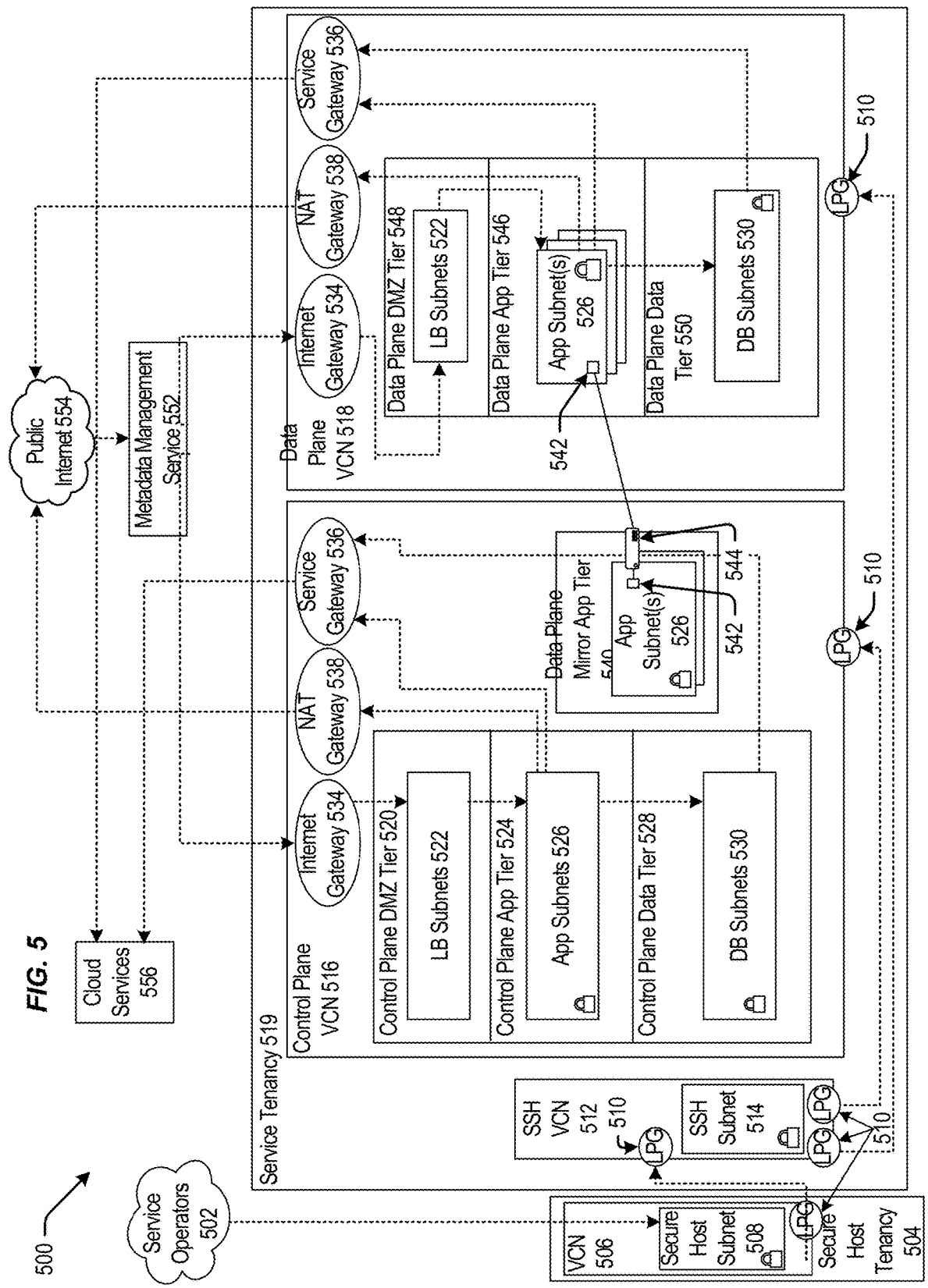
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively coupled to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
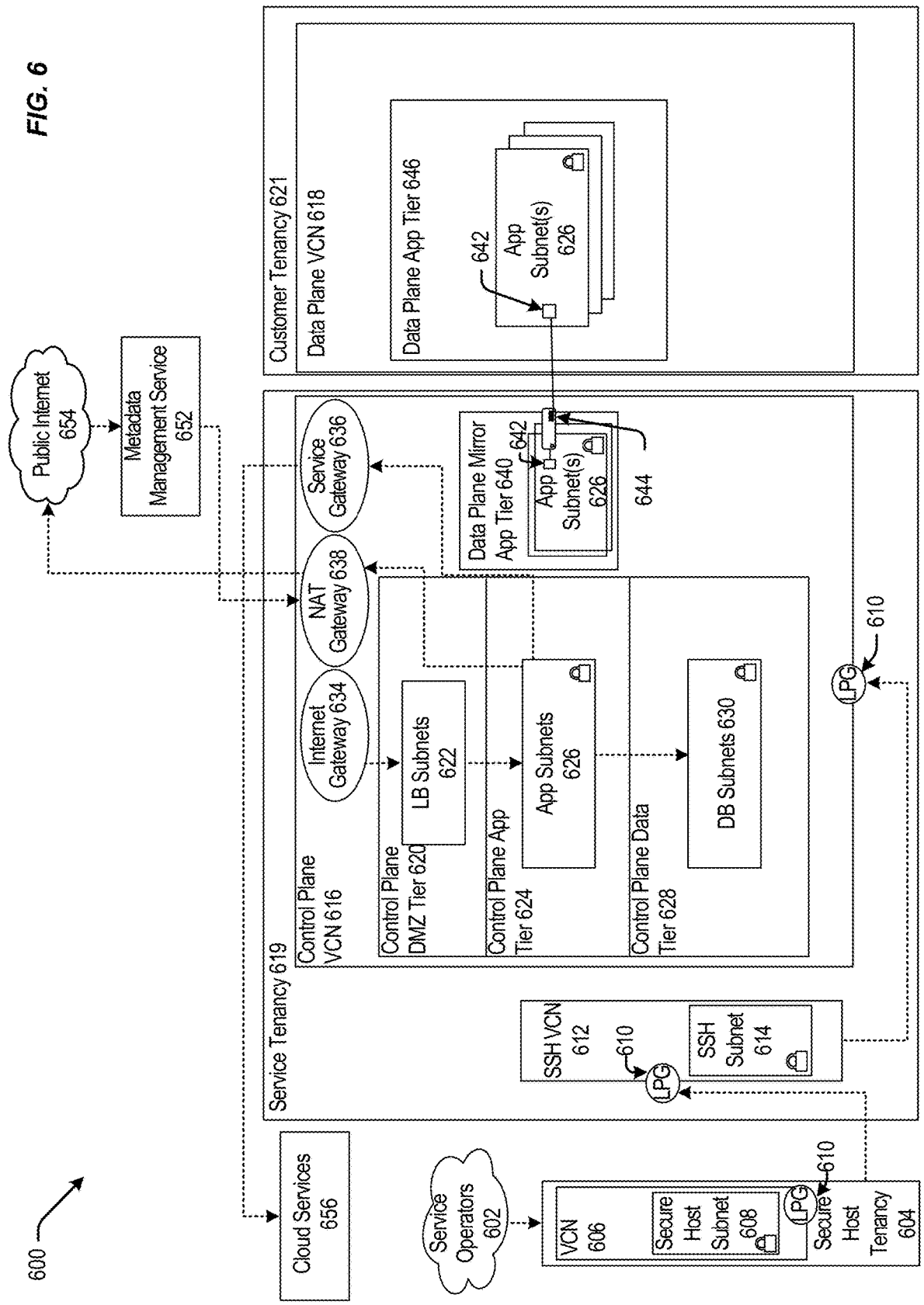
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively coupled to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
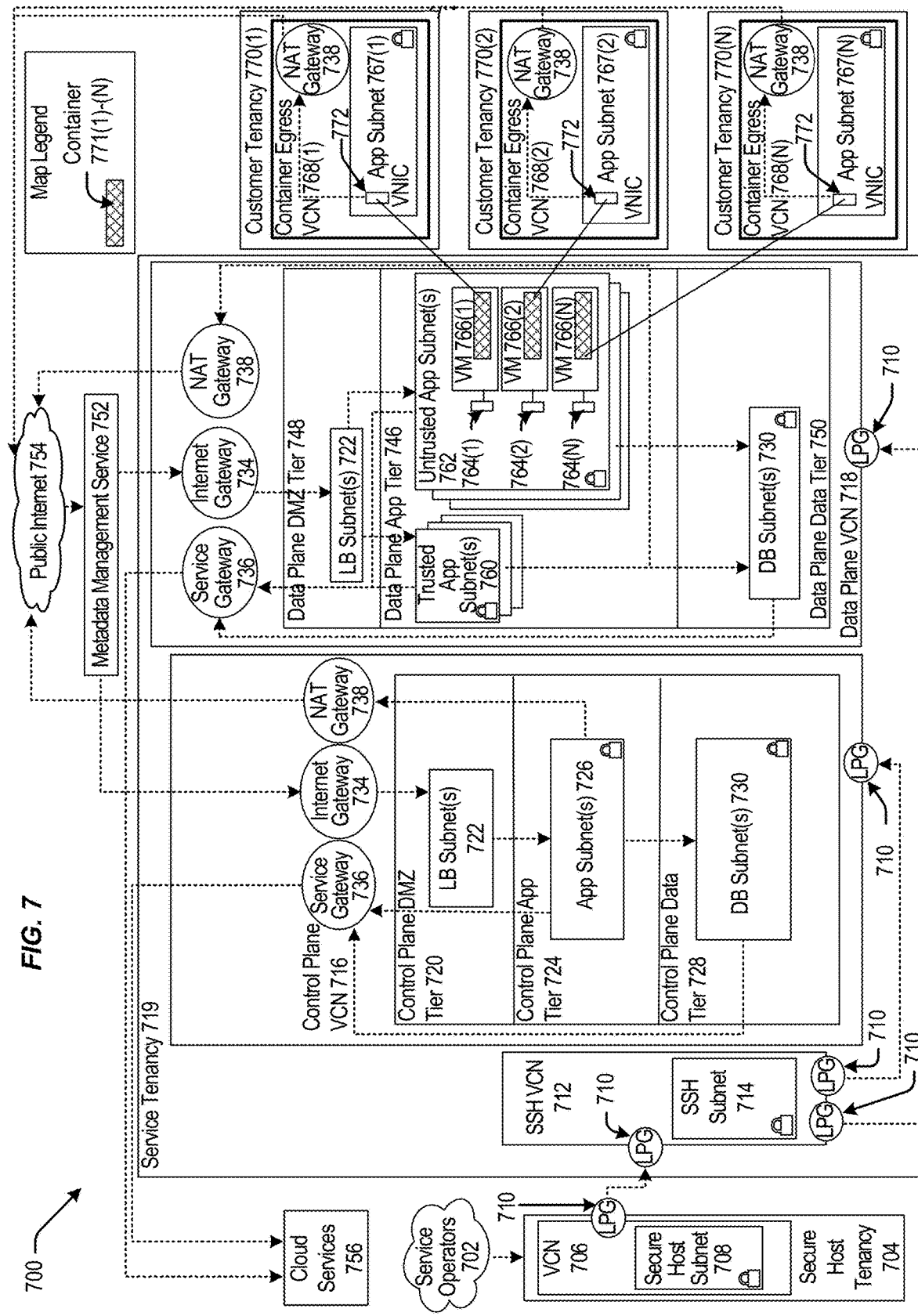
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively coupled to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
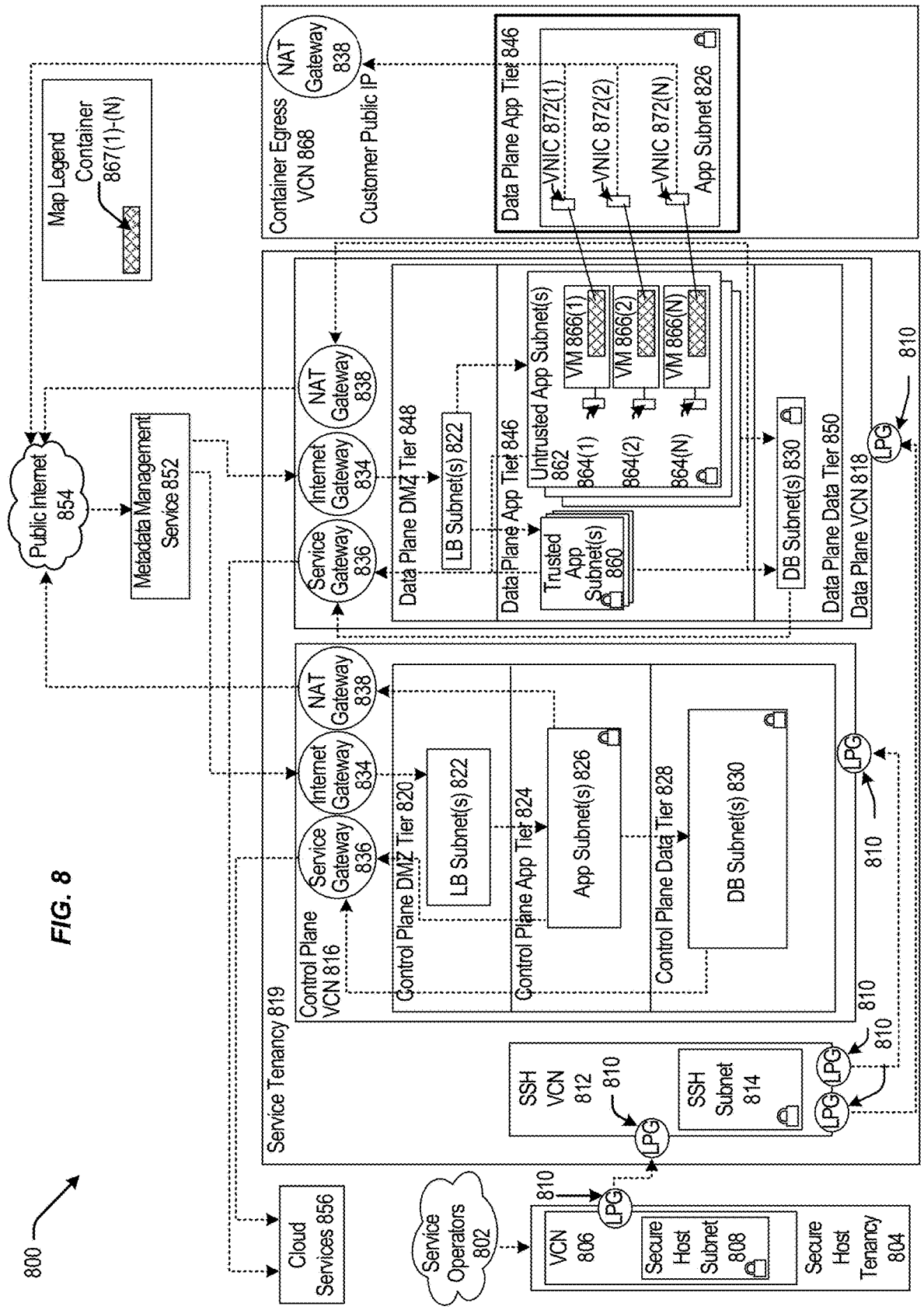
FIG. 8 is a block diagram illustrating another pattern for implementing a cloud infrastructure as a service system, according to at least one embodiment.
Figure 9:
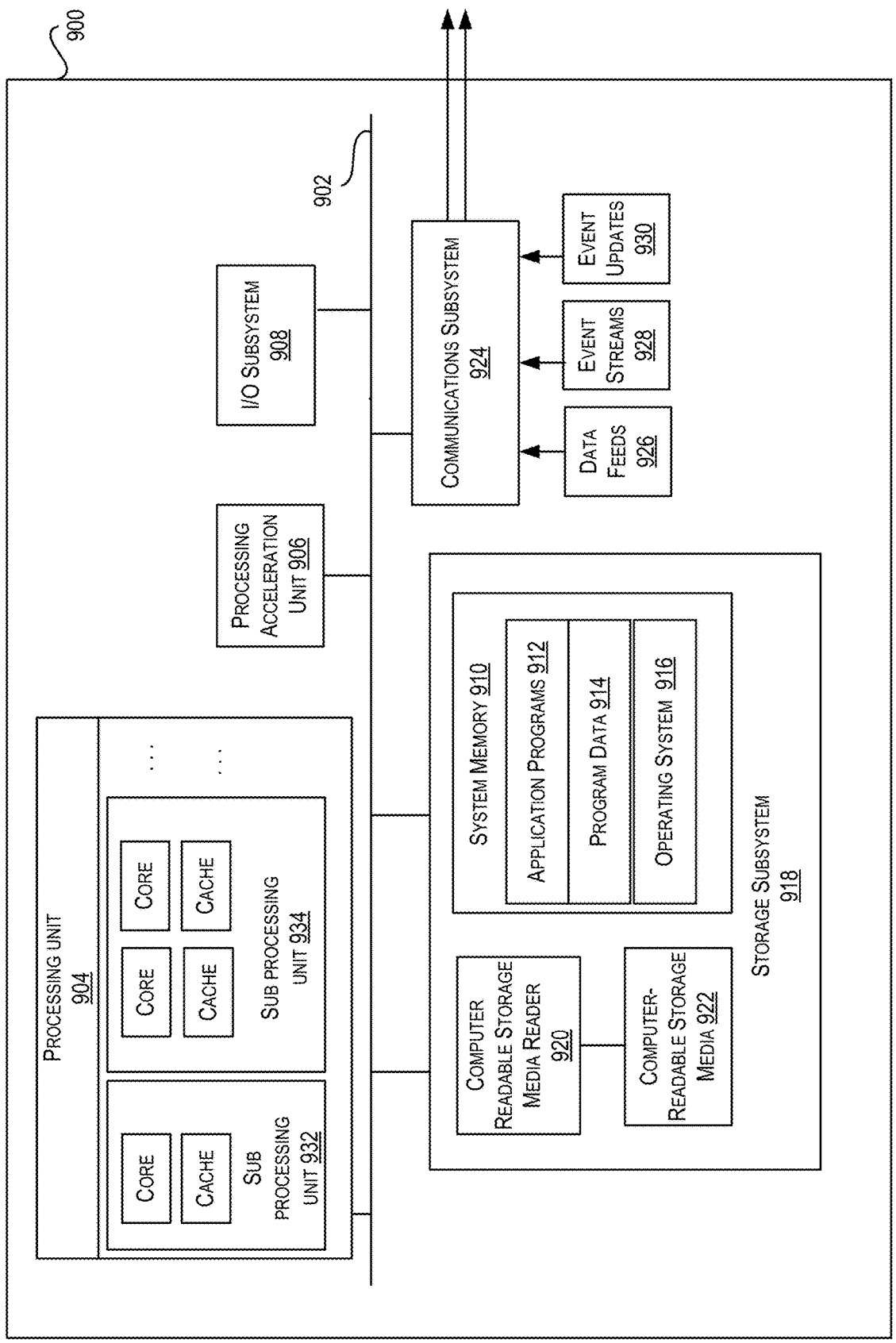
FIG. 9 is a block diagram illustrating an example of a computer system, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Example of a Computer System or Device

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 904 provide the functionality described above. Storage subsystem 918 may also provide a repository for storing data used in accordance with the present disclosure.

As depicted in the example in FIG. 9, storage subsystem 918 can include various components including a system memory 910, computer-readable storage media 922, and a computer readable storage media reader 920. System memory 910 may store program instructions that are loadable and executable by processing unit 904. System memory 910 may also store data that is used during the execution of the instructions and/or data that is generated during the execution of the program instructions. Various different kinds of programs may be loaded into system memory 910 including but not limited to client applications, Web browsers, mid-tier applications, relational database management systems (RDBMS), virtual machines, containers, etc.

System memory 910 may also store an operating system 916. Examples of operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 900 executes one or more virtual machines, the virtual machines along with their guest operating systems (GOSs) may be loaded into system memory 910 and executed by one or more processors or cores of processing unit 904.

System memory 910 can come in different configurations depending upon the type of computer system 900. For example, system memory 910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 910 may include a basic input/output system (BIOS) containing basic routines that help to transfer information between elements within computer system 900, such as during start-up.

Computer-readable storage media 922 may represent remote, local, fixed, and/or removable storage devices plus storage media for temporarily and/or more permanently containing, storing, computer-readable information for use by computer system 900 including instructions executable by processing unit 904 of computer system 900.

Computer-readable storage media 922 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Machine-readable instructions executable by one or more processors or cores of processing unit 904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method performed by a plurality of data processing systems, the method comprising:
    for an input dataset for which a metric is to be computed, partitioning the input dataset into a plurality of non-overlapping partitions, each partition in the plurality of non-overlapping partitions comprising a plurality of data points from the input dataset, wherein, for each data processing system in the plurality of data processing systems, a size of the input dataset is larger than a system memory associated with the data processing system;
    for each partition in the plurality of non-overlapping partitions, identifying a representative subset for the partition, wherein the representative subset for a partition comprises a subset of data points selected from the plurality of data points in the partition;
    iteratively merging the representative subsets identified for the plurality of non-overlapping partitions until there is a single subset;
    computing a value for the metric using the data points in the single subset; and
    outputting the value.

2. The computer-implemented method of claim 1, wherein each partition of the plurality of non-overlapping partitions is transmitted to a different data-processing system of the plurality of data-processing systems.

3. The computer-implemented method of claim 1, wherein the representative subset approximates the data points included in the partition, wherein the representative subset is included in a set of representative subsets, and wherein the set of representative subsets corresponds to the set of non-overlapping partitions.

4. The computer-implemented method of claim 1, wherein the computed value is an approximate value for the metric for the input dataset.

5. The computer-implemented method of claim 1, wherein identifying a representative subset for each partition in the plurality of partitions comprises:
performing processing by a first data processing system from the plurality of data processing system, wherein the performing processing by the first data processing system comprises:
receiving, by the first data processing system, a first partition of the plurality of non-overlapping partitions;
selecting, by the first data processing system, a first representative subset of datapoints from the datapoints in the first partition;
performing processing by a second data processing system from the plurality of data processing system, wherein the performing processing by the second data processing system comprises:
receiving, by the second data processing system, a second partition of the plurality of non-overlapping partitions; and
selecting, by the second data processing system, a second representative subset of datapoints from the datapoints in the second partition, wherein the processing performed by the first data processing system is performed concurrently with the processing performed by the second data processing system.

6. The computer-implemented method of claim 5, further comprising: merging the first representative subset and the second representative subset to identify a third representative subset, wherein merging the first representative subset and the second representative subset comprises identifying, from the first representative subset of datapoints and the second representative subset of datapoints, a third representative subset of datapoints, wherein a datapoint in the third representative subset of datapoints is in the first representative subset of datapoints or in the second representative subset of datapoints, and wherein merging the first representative subset and the second representative subset to identify the third representative subset is performed by a third data processing system from the plurality of data processing systems.

7. The computer-implemented method of claim 6, wherein:
the first representative subset is representative of a first partition or of a first merged dataset of previously merged representative subsets; and
the second representative subset is representative of a second partition or of a second merged dataset of previously merged representative subsets.

8. The computer-implemented method of claim 1, wherein the input dataset includes datapoints related to a machine-learning model, and wherein the metric is a metric associated with the machine-learning model.

9. The computer-implemented method of claim 8, wherein the metric measures a performance of the machine-learning model, and wherein the metric is an accuracy metric, a precision metric, or a recall metric.

10. The computer-implemented method of claim 9, further comprising determining whether to train the machine-learning model based upon the value computed for the metric.

11. The computer-implemented method of claim 1, further comprising receiving the input dataset as a stream.

12. A system comprising:
a plurality of data processing systems including a first data processing system, a second data processing system, and a third data processing system, wherein:
the first data processing system is configured to perform processing comprising:
receiving an input dataset for which a metric is to be computed;
partitioning the input dataset into a plurality of non-overlapping partitions, each partition in the plurality of non-overlapping partitions comprising a plurality of data points from the input dataset, the plurality of partitions including a first partition and a second partition;
communicating the first partition to the second data processing system; and
communicating the second partition to the third data processing system;
the second data processing system is configured to perform processing comprising selecting a subset of datapoints from datapoints in the first partition to form a first subset that is representative of the datapoints in the first partition;
the third data processing system is configured to perform processing comprising selecting a subset of datapoints from datapoints in the second partition to form a second subset that is representative of the datapoints in the second partition; and
at least one data processing system from the plurality of data processing system is configured to perform processing comprising:
receiving a final subset that is selected based upon a plurality of subsets selected for the plurality of partitions, the plurality of subsets including the first subset and the second subset;
computing a value for the metric using the datapoints in the final subset; and
outputting the computed value.

13. The system of claim 12, wherein:
the plurality of data processing systems further comprises a fourth data processing system; and
the fourth data processing system is configured to perform processing comprising:
receiving the first subset from the second data processing system;
receiving the second subset from the third data processing system;
merging datapoints in the first subset with datapoints in the second subset to form a merged subset; and
selecting a third subset that includes a subset of datapoints from the merged subset.

14. The system of claim 12, wherein the input dataset includes datapoints related to a machine-learning model, and wherein the metric is a metric associated with the machine-learning model.

15. The system of claim 14, wherein the metric represents a performance of the machine-learning model, and wherein the metric is an accuracy metric, a precision metric, or a recall metric.

16. The system of claim 12, wherein receiving the input dataset comprises receiving the input dataset as a stream.

17. A non-transitory computer-readable memory storing a plurality of instructions executable by one or more processors, the plurality of instructions comprising instructions that when executed by the one or more processors cause the one or more processors to perform operations comprising:
- for an input dataset comprising a plurality of data points, partitioning the input dataset into a plurality of non-overlapping partitions, each partition in the plurality of non-overlapping partitions comprising a plurality of data points from the input dataset;
- for each partition in the plurality of non-overlapping partitions, identifying a representative subset for the partition, wherein the representative subset for a partition comprises a subset of data points selected from the plurality of data points in the partition;
- iteratively merging the representative subsets identified for the plurality of non-overlapping partitions until there is a single subset;
- computing a metric value using the data points in the single subset; and
- outputting the metric value to a consumer of the metric value.

18. The non-transitory computer-readable memory of claim 17, wherein each partition of the plurality of non-overlapping partitions is transmittable to a different data-processing system of a set of data-processing systems, and wherein each partition of the set of non-overlapping partitions comprises a volume of data for which a corresponding data-processing system of the set of data-processing systems is configured to load all at the same time.

19. The non-transitory computer-readable memory of claim 17, wherein the representative subset is configured to approximate the data points included in the partition, and wherein the representative subset is included in a set of representative subsets corresponding to the set of non-overlapping partitions.

20. The non-transitory computer-readable memory of claim 17, wherein the input dataset includes datapoints related to a machine-learning model, wherein the metric is a metric associated with the machine-learning model, and wherein the input dataset is receivable as a stream.

* * * * *

UNITED STATES PATENT AND TRADEMARK OFFICE
CERTIFICATE OF CORRECTION

PATENT NO. : 12,367,217 B2
APPLICATION NO. : 18/655946
DATED : July 22, 2025
INVENTOR(S) : Shaikh et al.

Page 1 of 1

It is certified that error appears in the above-identified patent and that said Letters Patent is hereby corrected as shown below:

In the Specification

In Column 9, Line 17, delete "If, $P_i^* \subseteq P_i$ for all $i=1 \ldots n$," and insert --$If, P_i^* \subseteq P_i \text{ for all } i = 1 \ldots n,$--, therefor.

Signed and Sealed this
Sixteenth Day of December, 2025

John A. Squires
*Director of the United States Patent and Trademark Office*